(12) United States Patent
Yee

(10) Patent No.: US 6,591,899 B1
(45) Date of Patent: Jul. 15, 2003

(54) SPACECRAFT MULTI-DIRECTIONAL LOOP HEAT PIPE THERMAL SYSTEMS

(75) Inventor: Eddy M. Yee, Millbrae, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 50 days.

(21) Appl. No.: 09/717,585

(22) Filed: Nov. 21, 2000

(51) Int. Cl.[7] ............................................. F28D 15/00
(52) U.S. Cl. ........................... 165/104.26; 165/104.14
(58) Field of Search ................................ 165/80.3, 185, 165/104.26, 104.33; 29/890.032

(56) References Cited

U.S. PATENT DOCUMENTS

| | | | | |
|---|---|---|---|---|
| 3,753,364 A | * | 8/1973 | Runyanet et al. | ............ 165/133 |
| 3,788,388 A | * | 1/1974 | Barkmann | ................... 165/32 |
| 3,865,184 A | * | 2/1975 | Grover | .................. 165/104.26 |
| 4,273,100 A | * | 6/1981 | Cogliano | ............... 165/104.21 |
| 4,787,737 A | * | 11/1988 | Ogawa et al. | ................. 353/57 |
| 4,917,173 A | * | 4/1990 | Brown et al. | ........... 165/104.26 |
| 5,321,946 A | * | 6/1994 | Abdelmalek | ................ 60/648 |
| 6,073,887 A | * | 6/2000 | Hosick | ....................... 244/158 |
| 6,216,097 B1 | * | 4/2001 | Choo et al. | ................ 165/48.1 |
| 6,227,288 B1 | * | 5/2001 | Gluck et al. | ............ 165/104.26 |
| 6,230,790 B1 | * | 5/2001 | Hemingway et al. | ...... 165/80.4 |
| 6,269,865 B1 | * | 8/2001 | Huang | .................... 165/104.26 |
| 6,478,258 B1 | * | 11/2002 | Yee | .............................. 244/163 |

* cited by examiner

*Primary Examiner*—Henry Bennett
*Assistant Examiner*—Terrell McKinnon
(74) *Attorney, Agent, or Firm*—Kenneth W. Float

(57) ABSTRACT

Multi-directional (reversible and parallel) loop heat pipe thermal systems for use on a spacecraft. The multi-directional loop heat pipe thermal systems may comprise reversible or parallel loop heat pipes that provide efficient thermal pathways that are directionally independent between any combination of equipment mounting panels and radiator panels. Loop heat pipes of the reversible loop heat pipe thermal system are coupled between opposite ends of respective evaporator/condenser flanges. The evaporator/condenser flanges each comprise a condenser and an evaporator. The parallel loop heat pipe thermal system comprises pairs or sets of parallel heat pipes that are respectively coupled between a condenser flange and an evaporator flange. The reversible or parallel loop heat pipes may be routed to a multiple number of radiator panels in order to optimize the use of a radiator panel by always transporting heat to the coolest radiator panel.

8 Claims, 3 Drawing Sheets

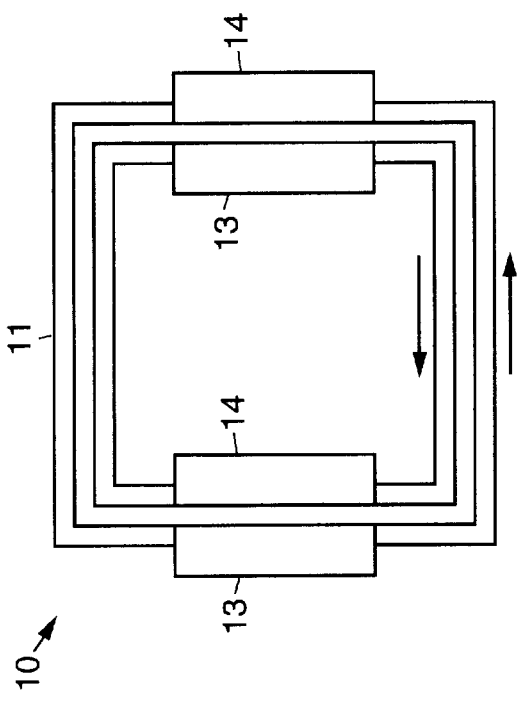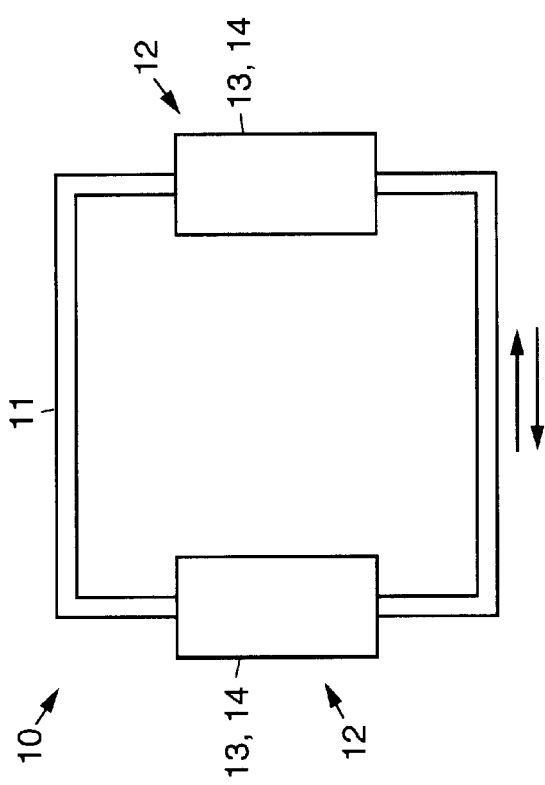

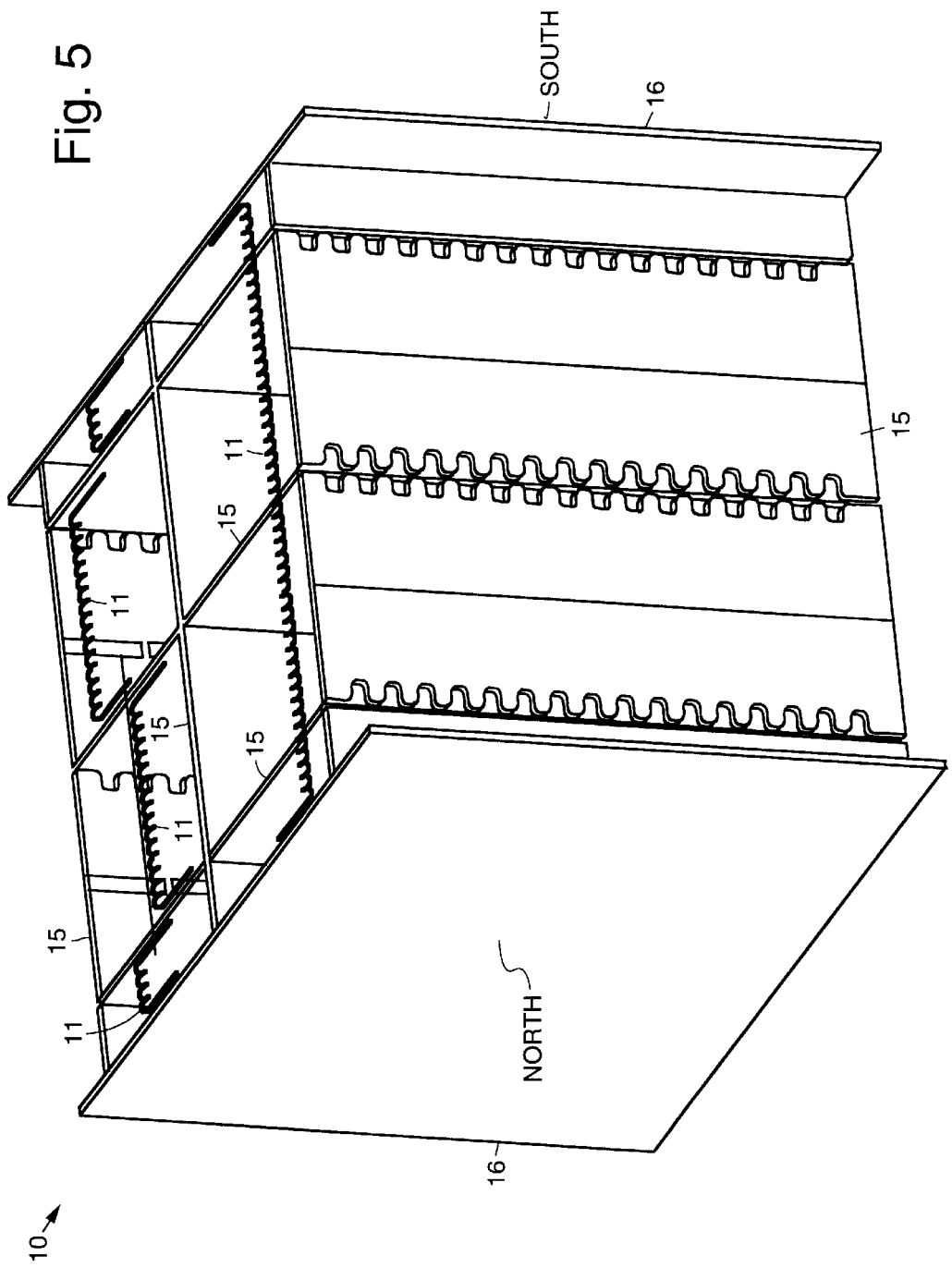

SPACECRAFT MULTI-DIRECTIONAL LOOP HEAT PIPE THERMAL SYSTEMS

BACKGROUND

The present invention relates generally to spacecraft, and more particularly, to multi-directional loop heat pipe thermal systems for use on a spacecraft.

The assignee of the present invention manufactures and deploys spacecraft containing communication equipment that orbit the earth. Heretofore, fixed conductance heat pipes have been used to transport heat from internal equipment panels to external radiator panels. Such fixed conductance heat pipes are disclosed in French Patent 2,463,058, for example. Aft deployable thermal radiators using loop heat pipes are disclosed in U.S. patent application Ser. No. 09/54396, filed Sep. 16, 1998, assigned to the assignee of the present invention. However, multi-directional loop heat pipes have not heretofore been used to provide cooling between internal equipment panels and external radiator panels.

Accordingly, it would be advantageous to have improved multi-directional loop heat pipe thermal systems for use on a spacecraft.

SUMMARY OF THE INVENTION

The present invention provides for multi-directional loop heat pipe thermal systems for use on a spacecraft. The multi-directional loop heat pipe thermal systems may take the form of a reversible or parallel loop heat pipe cooling system that provide efficient thermal pathways that are directionally independent between any combination of spacecraft equipment mounting panels and radiator panels. The reversible or parallel loop heat pipes may be routed to a multiple number of radiator panels in order to optimize the use of a radiator panel by always transporting heat to the coolest radiator panel.

Advantages of the present invention over known prior art include the following. The multi-directional reversible or parallel loop heat pipes have a much higher heat transport capability than fixed conductance heat pipes. The multi-directional reversible or parallel loop heat pipes are not directionally dependent and can transport heat in either direction. The multi-directional reversible or parallel loop heat pipes are flexible and easily routed. The multi-directional reversible or parallel loop heat pipes may be routed to multiple radiator panels in order to optimize heat sharing between radiator panels.

BRIEF DESCRIPTION OF THE DRAWINGS

The various features and advantages of the present invention may be more readily understood with reference to the following detailed description taken in conjunction with the accompanying drawings wherein like reference numerals designate like structural elements, and in which:

FIG. 1 illustrates an exemplary reversible loop heat pipe thermal system in accordance with the principles of the present invention for use on a spacecraft; and FIG. 2 illustrates an exemplary parallel loop heat pipe thermal system in accordance with the principles of the present invention for use on a spacecraft;

FIG. 5 is a perspective view of the spacecraft employing the exemplary multi-directional loop heat pipe thermal system.

DETAILED DESCRIPTION

Figure 3:
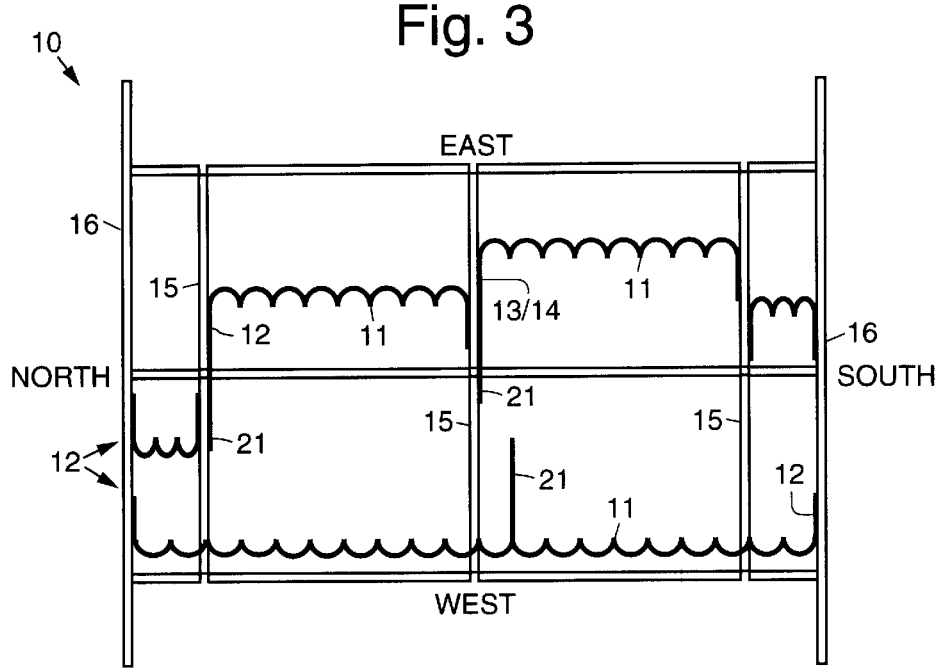
FIG. 3 is a top view of a spacecraft employing an exemplary multi-directional loop heat pipe thermal system.

Referring to the drawing figures, FIGS. 1 and 2 illustrate exemplary multi-directional loop heat pipe thermal systems 10 in accordance with the principles of the present invention for use on a spacecraft 20. In particular, FIG. 1 illustrates an exemplary reversible loop heat pipe thermal system 10, while FIG. 2 illustrates an exemplary parallel loop heat pipe thermal system 10.

Referring to FIG. 1, the exemplary reversible loop heat pipe thermal system 10 comprises loop heat pipes 11 that are respectively coupled between respective opposite ends of two evaporator/condenser flanges 12. In the exemplary reversible loop heat pipe thermal system 10, the evaporator/condenser flanges 12 can each function as a condenser 13 or an evaporator 14. The evaporator/condenser flanges 12 of a reversible loop heat pipe 11 automatcially functions as an evaporator 14 at the hot end of the loop heat pipe 11 and as a condenser 13 at the cold end of the loop heat pipe 11.

Figure 4:
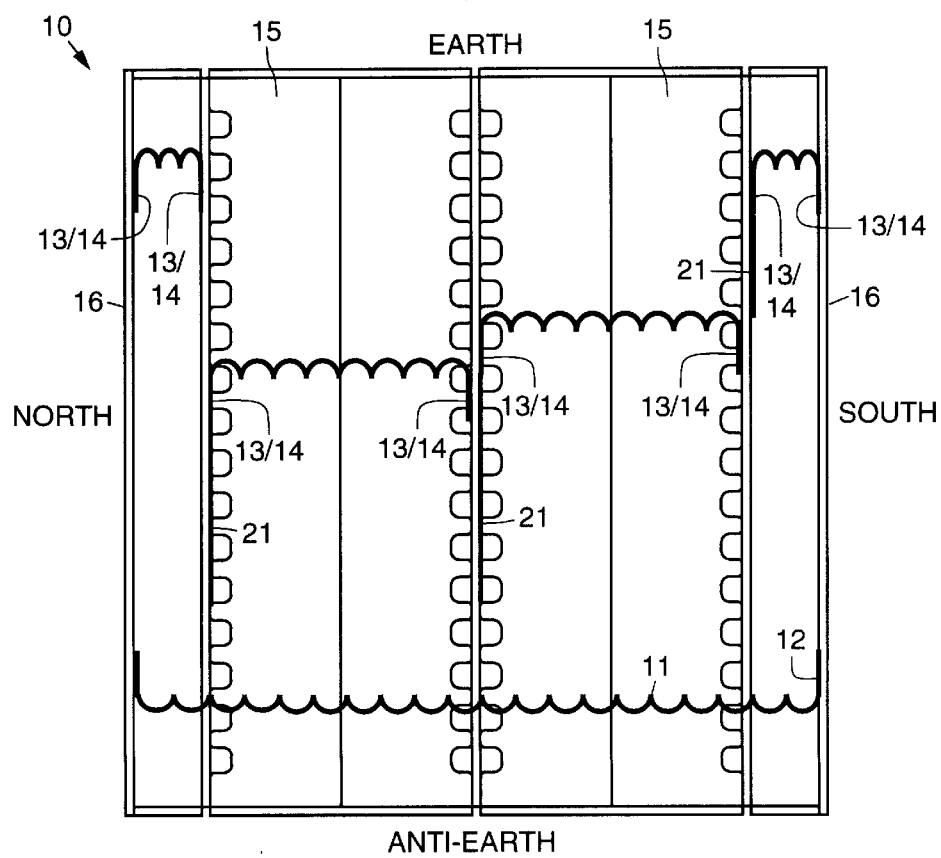
FIG. 4 is a cross sectional side view of the spacecraft employing the exemplary multi-directional loop heat pipe thermal system.

The evaporator/condenser flanges 12 are respectively mounted and coupled to selected equipment mounting panels and radiator panels on the spacecraft 20. This is illustrated in FIGS. 3–5.

Heat may be transported through the reversible loop heat pipe thermal system 10 in either the forward or reverse direction depending on the location of the heat. This is illustrated in FIGS. 1 and 2 by means of the directional arrows.

Referring to FIG. 2, the exemplary parallel loop heat pipe thermal system 10 comprises pairs or sets of parallel loop heat pipes 11 that are respectively coupled between a condenser flange 13 and an evaporator flange 14. The condenser flange 13 and the evaporator flange 14 are respectively mounted and coupled to selected equipment mounting panels and radiator panels on the spacecraft 20. This is illustrated in FIGS. 3–5.

As in the exemplary reversible loop heat pipe thermal system 10, heat may be transported through the parallel loop heat pipe thermal system 10 in either the forward or reverse direction depending on the location of the heat. Again, this is illustrated in FIGS. 1 and 2 by means of the directional arrows.

FIGS. 3–5 show the use of multi-directional loop heat pipes 11 coupled between various combinations of equipment mounting panels 15 and radiator panels 16. The total number of reversible loop heat pipes 11 depends on the overall heat load that must be removed from the equipment mounting panels 15. Each end of the reversible loop heat pipe 11 includes an evaporator/condenser flange 12 or a condenser flange 13 and an evaporator flange 14 that mounts directly onto the internal equipment panel 15 and/or the radiator panel 16. Fixed conductance heat pipes 21 (FIGS. 3 and 4) may be used in any or all of the internal equipment panels 15 and radiator panels 16 in order to collect and distribute heat loads to and from the multi-directional (reversible loop or parallel loop) heat pipes 11.

More particularly, and referring to FIG. 3, it is a top view of an exemplary multi-directional loop heat pipe thermal system 10 disposed on a spacecraft 20. FIG. 4 is a cross sectional side view of the exemplary multi-directional loop heat pipe thermal system 10 and FIG. 5 is a perspective view of the exemplary multi-directional loop heat pipe thermal system 10. The exemplary loop heat pipe cooling system 10 comprises multiple loop heat pipes 11 that are routed from one or more internally located equipment panels 15 to externally located radiator panels 16.

The total number of multi-directional loop heat pipes 11 used in the cooling system 10 depends on the overall heat load. The multi-directional loop heat pipes 11 may be coupled from one internal equipment panel 15 to and radiator panel 16, such as is shown in FIGS. 3 and 4, for example. For example, the multi-directional loop heat pipes 11 may be coupled to a north-facing radiator panel 16 and a south-facing radiator panel 16. Alternatively, the multi-directional loop heat pipe 11 may be coupled to each of the north, south, east, west, earth and anti-earth facing radiator panels 16, or any combination thereof.

The multi-directional loop heat pipes 11 are distributed and routed for each of the internally located equipment panels 15, as required, although this is not an absolute requirement. Heat is collected at the evaporator 14 of each multi-directional loop heat pipe 11 and then transported to the condenser 13 of the respective multi-directional loop heat pipe 11.

The loop heat pipes 11 used in the cooling system 10 have a much higher heat transport capability than conventional fixed conductance heat pipes. The loop heat pipes 11 are flexible and are easily routed. The loop heat pipes 11 used in the multi-directional loop heat pipe thermal systems 10 can be routed to multiple radiator panels 16 in order to optimize heat sharing between radiator panels 16. The loop heat pipes 11 can transport heat in either direction.

Thus, improved multi-directional loop heat pipe thermal systems for use on a spacecraft have been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A multi-directional thermal system for use on a spacecraft, comprising:
   a plurality of multi-directional loop heat pipes that are routed from one or more internally located equipment panels of the spacecraft to externally located radiator panels of the spacecraft.

2. The thermal system recited in claim 1 wherein the multi-directional loop heat pipes comprise reversible loop heat pipes.

3. The thermal system recited in claim 1 wherein the multi-directional loop heat pipes comprise parallel loop heat pipes.

4. The thermal system recited in claim 2 wherein the reversible loop heat pipes are coupled to the equipment panels and externally located radiator panels using evaporator/condenser flanges that each comprise a condenser flange and an evaporator flange.

5. The thermal system recited in claim 3 wherein the parallel loop heat pipes are coupled to the equipment panels and externally located radiator panels at opposite ends using a condenser flange and an evaporator flange.

6. The thermal system recited in claim 1 further comprising:
   one or more fixed conductance heat pipes mounted to selected internally facing surfaces of the one or more internally located equipment panels that are coupled to selected ones of the multi-directional loop pipes.

7. The thermal system recited in claim 1 further comprising:
   one or more reverisble loop heat pipes disposed between the equipment and/or radiator panels.

8. The thermal system recited in claim 1 further comprising:
   one or more parallel loop heat pipes disposed between the equipment and/or radiator panels.

* * * * *